(12) United States Patent
Skaff et al.

(10) Patent No.: US 8,532,377 B2
(45) Date of Patent: Sep. 10, 2013

(54) IMAGE RANKING BASED ON ABSTRACT CONCEPTS

(75) Inventors: Sandra Skaff, Grenoble (FR); Luca Marchesotti, Grenoble (FR); Gabriela Csurka, Crolles (FR)

(73) Assignee: Xerox Corporation, Norwalk, CT (US)

(*) Notice: Subject to any disclaimer, the term of this patent is extended or adjusted under 35 U.S.C. 154(b) by 280 days.

(21) Appl. No.: 12/975,712

(22) Filed: Dec. 22, 2010

(65) Prior Publication Data
US 2012/0163710 A1    Jun. 28, 2012

(51) Int. Cl.
*G06K 9/00*    (2006.01)

(52) U.S. Cl.
USPC .......................... 382/165; 382/305; 707/723

(58) Field of Classification Search
None
See application file for complete search history.

(56) References Cited

U.S. PATENT DOCUMENTS

| | | | |
|---|---|---|---|
| 5,254,978 A * | 10/1993 | Beretta | 345/601 |
| 5,586,197 A | 12/1996 | Tsujimura et al. | |
| 6,326,977 B1 * | 12/2001 | Westerman | 345/591 |
| 6,463,426 B1 * | 10/2002 | Lipson et al. | 1/1 |
| 6,542,631 B1 * | 4/2003 | Ishikawa | 382/162 |
| 7,133,560 B2 * | 11/2006 | Lee | 382/226 |
| 2001/0043345 A1 * | 11/2001 | Rumph et al. | 358/1.9 |
| 2003/0012428 A1 | 1/2003 | Syeda-Mahmood | |
| 2003/0021481 A1 | 1/2003 | Kasutani | |
| 2003/0048943 A1 * | 3/2003 | Ishikawa | 382/166 |
| 2006/0015497 A1 * | 1/2006 | Keating et al. | 707/6 |
| 2006/0066629 A1 * | 3/2006 | Norlander et al. | 345/594 |
| 2006/0106764 A1 * | 5/2006 | Girgensohn et al. | 707/3 |
| 2006/0164664 A1 | 7/2006 | Lee et al. | |
| 2007/0005356 A1 | 1/2007 | Perronnin | |
| 2007/0019864 A1 * | 1/2007 | Koyama et al. | 382/218 |
| 2008/0046410 A1 | 2/2008 | Lieb | |

(Continued)

OTHER PUBLICATIONS

N. Vasconcelos and A. Lippman, "Embedded Mixture Modeling for Efficient Probabilistic Content-Based Indexing and Retrieval", in Proc. of SPIE Conf. on Multimedia Storage and Archiving Systems III, Boston, 1998.*

(Continued)

*Primary Examiner* — Barry Drennan
*Assistant Examiner* — Feng Niu
(74) *Attorney, Agent, or Firm* — Fay Sharpe LLP (57) ABSTRACT

A system and method for ranking images are provided. The method includes receiving a query comprising a semantic part and an abstract part, retrieving a set of images responsive to the semantic part of the query, and computing first scores for the retrieved images in the set of retrieved images. The first score of an image can be based on a relevance of that image to the semantic part of the query (and not to the abstract part of the query). The method further includes identifying a chromatic concept model from a set of chromatic concept models. This identification can be based on the abstract part of the query (and not on the semantic part of the query). The chromatic concept model includes an optionally-weighted set of colors expressed in a perceptually uniform color space. For retrieved images in the set of retrieved images, the method includes computing a chromatic image model based on colors of the image, the chromatic image model comprising a weighted set of colors expressed in the perceptually uniform color space and computing a comparison measure between the chromatic image model and the chromatic concept model. The retrieved images are scored with respective second scores that are based on the computed comparison measures. The retrieved images are ranked based on a combined score for a respective retrieved image which is a function of the first and second scores.

18 Claims, 3 Drawing Sheets

(56) References Cited

U.S. PATENT DOCUMENTS

| | | | |
|---|---|---|---|
| 2008/0046424 A1 | 2/2008 | Horton | |
| 2008/0101691 A1* | 5/2008 | Ameline et al. | 382/162 |
| 2008/0240572 A1 | 10/2008 | Hoshii | |
| 2008/0285860 A1* | 11/2008 | Datta et al. | 382/224 |
| 2009/0231355 A1* | 9/2009 | Perronnin | 345/594 |

OTHER PUBLICATIONS

USnews (usnews-2009-university ranking).*
Sahbi, et al. "Graph-Cut Transducers for Relevance Feedback in Content Based Image Retrieval," in IEEE 11th International Conference on Computer Vision (ICCV), 2007.
Jegou, et al. Hamming embedding and weak geometric consistency for large scale image search, Proceedings of the 10th European Conference on Computer Vision (ECCV '08): Part I.
Chum, et al. "Geometric min-Hashing: Finding a Thick Needle in a Haystack, " IEEE Conference on Computer Vision and Pattern Recognition (CVPR), Jun. 20-25, 2009.
Laaksonen, et al. "PicSOM self-organizing image retrieval with MPEG-7 content descriptions," IEEE Transactions on Neural Networks, vol. 13, No. 4, 2002.
Li, et al. "Image Annotation by Large-Scale Content based Image Retrieval," in Proc. of ACM Int. Conf. on Multimedia, 2006.
Wang, et al. "AnnoSearch: Image Auto-Annotation by Search," in CVPR, 2006.
Barnard, et al. "Matching words and pictures," Journal of Machine Learning Research, No. 3., 2003, pp. 1107-1135.
Rubner, et al. "A Metric for Distributions with Applications to Image Databases," ICCV, Jan. 1998, pp. 59-66.
Datta, et al. "Studying Aesthetics in Photographic Images Using a Computational Approach," ECCV, 2006, 3, 288-301.
U.S. Appl. No. 12/890,049, filed Sep. 24, 2010, Skaff, et al.
U.S. Appl. No. 12/693,795, filed Jan. 26, 2010, Skaff, et al.
U.S. Appl. No. 12/908,410, filed Oct. 20, 2010, Marchesotti, et al.
U.S. Appl. No. 12/632,107, filed Dec. 7, 2009, Marchesotti, et al.
U.S. Appl. No. 12/960,018, filed Dec. 3, 2010, Gordo, et al.
Monay, et al. "On image auto-annotation with latent space models," in Int. Conf. on Multimedia, 2003.
Jeon, et al. "Automatic image annotation and retrieval using cross-media relevance models," in Proceedings of the 26th Annual International ACM SIGIR Conference on Research and Development in Information Retrieval, SIGIR 2003.
Guillaumin, et al. "TagProp: Discriminative metric learning in nearest neighbor models for image auto-annotation," ICCV 2009.
Fedorovskaya, et al. "Image Harmony for Consumer Images," 15th IEEE International Conference on Image Processing, ICIP 2008.
Davis, et al. "Analysis of Human Attractiveness Using Manifold Kernel Regression," ICIP 2008.
Jacobsen, et al. "Brain correlates of aesthetic judgment of beauty," NeuroImage, 29, 2006, 276-285—Abstract only.
Loui, et al. " Multidimensional Image Value Assessment and Rating for Automated Albuming and Retrieval," ICIP 2008.
Zhang, et al. "EnjoyPhoto—A Vertical Image Search Engine for Enjoying High-Quality Photos", MM'06, Oct. 23-27, 2006, Santa Barbara, California.
Yee, et al. Faceted Metadata for Image Search and Browsing, ACM, CHI 2003.
Ou, et al. "A study of colour emotion and colour preference. Part I: Colour emotions for single colours," Color Research and Application, 29, 232-240, 2004.
Ou, et al. "A study of colour emotion and colour preference. Part II: Colour emotions for two-colour combinations," Color Research and Application, 29, 292-298, 2004.
Ou, et al. "A study of colour emotion and colour preference. Part III: Colour Preference Modeling," Color Research and Application, 29, 381-389, 2004.
Wu, et al. "Content-Based Affective Image Classification and Retrieval Using Support Vector Machines," Lecture Notes in Computer Science, 2005, vol. 3784/2005, 239-247—Abstract Only.
Solli, et al. "Color Emotions for Image Classification and Retrieval," CGIV, 2008.
www.ece.rochester.edu/~gsharma/ciede2000/ accessed Nov. 9, 2010.
Sharma, et al. "The CIEDE2000 Color-Difference Formula Implementation Notes, Supplementary Test Data, and Mathematical Observations," Color Research and Application, vol. 30, No. 1, Feb. 2005.
Datta, et al. "Algorithmic inferencing of aesthetics and emotions in natural images," IEEE International Conference on Image Processing, 2008.
Csurka, et al. "Learning moods and emotions from color combinations," ICVGIP 2010.
Levenshtein Distance, www.wikipedia.org/wiki/Levenshtein_distance, accessed Nov. 9, 2010.
Solli, et al. "Color Harmony for Image Indexing" 2009 IEEE $12^{th}$ Intl. Conf. on Computer Vision Workshops, ICCV Workshops, 2009, pp. 1885-1892.
Solli, et al. "Emotion Related Structures in Large Image Databases" CIPR'10, Jul. 5-7, 2010, pp. 398-405.
Solli, et al. "Color Semantics for Image Indexing", CGIV 2010: $5^{th}$ European Conference on Colour in Graphics, Imaging, and Vision, 2010, pp. 353-358.

* cited by examiner

IMAGE RANKING BASED ON ABSTRACT CONCEPTS

CROSS REFERENCE TO RELATED PATENTS AND APPLICATIONS

The following copending applications, the disclosures of which are incorporated herein by reference in their entireties, are mentioned:

U.S. application Ser. No. 12/890,049, filed Sep. 24, 2010, entitled SYSTEM AND METHOD FOR IMAGE COLOR TRANSFER BASED ON TARGET CONCEPTS, by Sandra Skaff, et al.

U.S. patent application Ser. No. 12/693,795, filed Jan. 26, 2010, entitled A SYSTEM FOR CREATIVE IMAGE NAVIGATION AND EXPLORATION, by Sandra Skaff, et al.

U.S. patent application Ser. No. 12/908,410, filed Oct. 20, 2010, entitled CHROMATIC MATCHING GAME, by Luca Marchesotti, et al.

U.S. patent application Ser. No. 12/632,107, filed Dec. 7, 2009, entitled SYSTEM AND METHOD FOR CLASSIFICATION AND SELECTION OF COLOR PALETTES, by Luca Marchesotti, et al.

U.S. application Ser. No. 12/960,018, filed Dec. 3, 2010, entitled LARGE-SCALE ASYMMETRIC COMPARISON COMPUTATION FOR BINARY EMBEDDINGS, by Albert Gordo, et al.

BACKGROUND

The exemplary embodiment relates to image retrieval. It finds particular application in connection with a system and method for ranking retrieved images based on aesthetic concepts, and will be described with particular reference thereto.

Photographic images are often collected and stored in large databases with tags which describe their semantic content, such as "sky," or "flower," or their aesthetic features, such as "happy," "funny," "romantic," and the like. Such databases are accessed by a variety of users searching for suitable images to meet a particular need. A user may, for example, combine keywords such as "romantic" and "beach" in an expectation of retrieving romantic-looking beach scenes.

One problem with this approach is that aesthetic textual tags applied to images tend to be "noisy" and often do not express an abstract concept well. Thus, the retrieved results of such a search may be disappointing to the user.

Recently, methods have been proposed for learning and predicting some aesthetic value of an image, such as image harmony or human attractiveness. However, such methods do not lend themselves to widespread use by inexperienced searchers.

INCORPORATION BY REFERENCE

The following references, the disclosures of which are incorporated herein in their entireties by reference, are mentioned:

Visual classification and image retrieval methods are described, for example, in: U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Florent Perronnin, et al.; U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUNLENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20030021481, published Jan. 30, 2003, entitled IMAGE RETRIEVAL APPARATUS AND IMAGE RETRIEVING METHOD, by E. Kasutani; U.S. Pub. No. 20080240572, published Oct. 2, 2008, entitled IMAGE SEARCH APPARATUS AND IMAGE SEARCH METHOD, by J. Hoshii; U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin, et al.; U.S. patent application Ser. No. 12/693,795, filed on Jan. 26, 2010, entitled A SYSTEM FOR CREATIVE IMAGE NAVIGATION AND EXPLORATION, by Sandra Skaff, et al.; Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010; G. Csurka, C. Dance, L. Fan, J. Willamowski and C. Bray, "Visual Categorization with Bags of Keypoints," ECCV Workshop on Statistical Learning in Computer Vision, 2004; Herve Jegou, Matthijs Douze, and Cordelia Schmid, "Hamming embedding and weak geometric consistency for large scale image search," in ECCV 2008; Jorma Laaksonen, Markus Koskela, and Erkki Oja, "PicSOM self-organizing image retrieval with MPEG-7 content descriptions," IEEE Transactions on Neural Networks, vol. 13, no. 4, 2002.

Methods for selecting images based on color content are described, for example, in U.S. Pub. No. 20080046424, entitled SYSTEM AND METHOD OF SELECTING IMAGES ACCORDING TO COLOR CONTENT, by R. B. Horton; U.S. Pat. No. 5,586,197, entitled IMAGE SEARCHING METHOD AND APPARATUS THEREOF USING COLOR INFORMATION OF AN INPUT IMAGE, by Tsujimura, et al.; U.S. Pub. No. 20080046410, entitled COLOR INDEXING AND SEARCHING FOR IMAGES, by Lieb; U.S. Pub. No. 20030012428, entitled METHOD AND APPARATUS FOR INDEXING AND RETRIEVING IMAGES FROM AN IMAGE DATABASE BASED ON A COLOR QUERY, by T. F. Syeda-Mahmood; U.S. Pub. No. 20060164664, entitled COLOR QUANTIZATION AND METHOD THEREOF AND SEARCHING METHOD USING THE SAME, by J-S. Lee, et al.; U.S. Pub. No. 20030021481, entitled IMAGE RETRIEVAL APPARATUS AND IMAGE RETRIEVING METHOD, by E. Kasutani; U.S. Pub. No. 20080240572, published 2008, entitled IMAGE SEARCH APPARATUS AND IMAGE SEARCH METHOD, by J. Hoshii; and in Solli, M. & Lenz, R., "Color Emotions for Image Classification and Retrieval," CGIV, 2008.

BRIEF DESCRIPTION

In accordance with one aspect of the exemplary embodiment, a method for ranking images is provided. The method includes receiving a query including a semantic part and an abstract part. A set of images responsive to the semantic part of the query is retrieved. First scores are computed for the images in the set of retrieved images. The first score of an image is based on a relevance to the semantic part of the query. One of a set of chromatic concept models is identified, based on the abstract part of the query. The identified chromatic concept model includes an optionally-weighted set of colors expressed in a perceptually uniform color space. Then, for an image in the set of retrieved images, the method includes computing a chromatic image model based on colors of the image. The chromatic image model includes a weighted set of colors expressed in the perceptually uniform color space. A comparison measure is computed between the chromatic image model and the chromatic concept model. The retrieved images are scored with respective second scores that are based on the computed comparison measures. The retrieved images are ranked based on a combined score which, for a respective retrieved image. is a function of its first and second scores.

In another aspect, a system for ranking images includes a set of chromatic concept models stored in memory. Each chromatic concept model includes an optionally-weighted set of colors expressed in a perceptually uniform color space which represents an abstract concept. A chromatic image component computes a chromatic image model for each of a set of images retrieved in response to a semantic part of an input query, based on colors of the image. The chromatic image model includes a weighted set of colors expressed in the perceptually uniform color space. A scoring component scores the retrieved images in the set of retrieved images. The score for each image is based on a relevance to the semantic part of an input query and a comparison measure between its computed chromatic image model and a selected one of the chromatic concept models. A visualization component generates a visualization of the retrieved images based on their respective scores.

In another aspect, a method for ranking images includes providing a set of chromatic concept models in non-transitory memory. Each of the chromatic concept models includes an optionally-weighted set of colors expressed in a perceptually uniform color space which is representative of an abstract concept. A set of images is retrieved from a database. The retrieved images are responsive to a textual query. For images in the set, the method includes computing a respective chromatic image model based on colors of the image. Each chromatic image model includes a weighted set of colors expressed in a perceptually uniform color space. A combined score is computed for a respective image in the set of retrieved images with which is based on the relevance of the image to the textual query and a distance of the image's chromatic image model to a selected one of the chromatic concept models.

In another aspect, a method for generating a system for ranking images is provided. The method includes, for each of a set of abstract concepts, with an algorithm, generating a set of chromatic concept models, each of the chromatic concept models comprising an optionally-weighted set of colors expressed in a perceptually uniform color space which is representative of an abstract concept. The method further includes providing a component which generates a respective chromatic image model based on colors of an image, the chromatic image model comprising a weighted set of colors expressed in a perceptually uniform color space. A scoring component is provided for scoring images retrieved in response to a query with a combined score which is based on the relevance of the images to a semantic part of the query and a distance of a respective chromatic image model to a selected one of the chromatic concept models.

DETAILED DESCRIPTION

Aspects of the exemplary embodiment relate to a system and method for image ranking based on both semantic and abstract (e.g., aesthetic) concepts (such as "classic," "romantic," and the like). In the exemplary method, a query is generated by a user specifying a textual query part, such as one or more textual tags describing the semantic content of the image (such as "beach") and an abstract query part, based on an abstract concept (such as "romantic"). A search engine is used to retrieve a preliminary set of images based the relevance of the retrieved images to a semantic part of the query. The semantic part of the query may be the textual query part. In some embodiments, the semantic part of the query alternatively or additionally includes the abstract query part, but considered as a semantic query. Each retrieved image in the set is associated with a relevance score based on its relevance to the semantic query. A computed chromatic concept model is identified which corresponds to the abstract query part. The chromatic concept model is used to compute a second relevance score. This score is based, for each retrieved image, on a comparison measure (such as similarity or distance) between a chromatic image model which is extracted from the image and the identified chromatic concept model. The images in the set can then be ranked based on a combination of the two scores.

The exemplary method allows images which have been ranked by a semantic-based ranking scheme to be "re-ranked" by abstract concepts, or vice versa (effectively, the image ranked with a combination of abstract and semantic rankings/scores).

The abstract concepts are thus represented herein by chromatic concept models (CCM's), e.g., optionally-weighted color palettes, which can be learned offline. Each predefined abstract concept in a set of such abstract concepts is associated with a respective CCM. The CCM serves as a reference when ranking images according to a particular abstract concept. The ranking of images based on abstract concept can be based on a comparison measure between a chromatic image model (CIM), e.g., an optionally-weighted color palette, representing the colors of the image, and a respective CCM for a selected abstract concept. The exemplary comparison measure is a distance measure which is referred to hereon as the Color-based Earth Mover's Distance (CEMD). This measure is an adaptation of the conventional Earth Mover's Distance (EMD). It is generated by converting color values into a perceptually uniform color space and using a distance metric, such as a Euclidian distance-based formula (e.g., CIEDE2000), to obtain a distance measure between the first set of representative colors (the CIM) and the second set of representative colors (the CCM), as explained in further detail below.

The term "abstract concept" is used herein to refer to emotions, moods, and other aesthetic concepts. Examples of such concepts are "romantic," "capricious," and "serene."

A "color palette," as used herein, is a limited set of different colors, which may be displayed as an ordered or unordered sequence of swatches, one for each color in the set. The colors in a "predefined color palette" may have been selected by a graphic designer, or other skilled artisan working with color, to harmonize with each other, when used in various combinations. Color palettes may be stored in memory by the color values (e.g., RGB color values or Lab color values) of each swatch.

A "chromatic concept model" (CCM) is a chromatic representation of an abstract (aesthetic) concept and includes a set of colors (variously referred to herein as a "color palette"). The colors in the set may each be weighted with a respective weight to reflect their relative importance. Each color in the set of colors may be represented in a perceptually uniform color space. In the exemplary embodiment, each CCM is derived from one or more predefined color palettes each of which may have the same number (or different numbers) of visually distinguishable colors. Each of these predefined color palettes is associated, in computer memory, with the respective one of the predefined abstract concepts. Each abstract concept thus has its own representative CCM.

A chromatic image model "CIM" refers to a set of colors (a color palette), which has been extracted from a digital image, based on the colors present in the digital image. As with the CCM palette, these colors may each be weighted with a respective weight, to reflect their relative importance. Each CIM generated may have the same number of colors or a different number. For example, the CIM may have at least four and, in one embodiment, no more than ten colors. Each CIM may have the same number of colors as the selected CCM, or may have a different number of colors. As will be appreciated, a digital photographic image typically has far more than five or ten different colors and the extracted CIM includes many fewer colors than the digital image from which it is extracted. Each image thus has its own representative CIM.

A "perceptually uniform color space" is a color space in which a comparison measure (e.g., a distance or similarity measure such as the Euclidean distance), between colors corresponds to a human perceptible color difference. Such a color space is a lightness-chrominance color space with a lightness component (sometimes referred to as a luminance component). Exemplary perceptually uniform color spaces include Lab (e.g., the CIELAB color space L*a*b*), CIEXYZ, YCbCr, YUV, YIQ, YES, and LUV. Where a chromatic object (e.g., a digital image or a predefined color palette associated with the abstract concept) to be modeled is not expressed in a perceptually uniform color space, it may be converted to such a color space. In the exemplary embodiment, the color information of a retrieved image or color palette may be initially defined in RGB color space. In RGB color space, each pixel's color is determined by a red component, a green component, and a blue component. This information is converted to a color space having a lightness value, e.g., L, and two or more chrominance values, (e.g., a,b) which refer to hue and saturation values. For example, the image data may be input in RGB values and converted to a Lab lightness-chrominance color space. Various methods exist for converting image pixel representations from one color space to another. For example, a color space conversion component may include a look up table or other data structure to which the RGB image data is fed, which outputs the corresponding lightness-chrominance values. In some embodiments, the lightness component may be ignored for the purposes of the exemplary method. Thus in the case of Lab, in this embodiment, only the a and b components are used.

A "digital image" (or simply "image") can be in any convenient file format, such as JPEG, Graphics Interchange Format (GIF), JBIG, Windows Bitmap Format (BMP), Tagged Image File Format (TIFF), JPEG File Interchange Format (JFIF), Delrin Winfax, PCX, Portable Network Graphics (PNG), DCX, G3, G4, G3 2D, Computer Aided Acquisition and Logistics Support Raster Format (CALS), Electronic Arts Interchange File Format (IFF), IOCA, PCD, IGF, ICO, Mixed Object Document Content Architecture (MO:DCA), Windows Metafile Format (WMF), ATT, (BMP), BRK, CLP, LV, GX2, IMG (GEM), IMG (Xerox), IMT, KFX, FLE, MAC, MSP, NCR, Portable Bitmap (PBM). Portable Greymap (PGM), SUN, PNM, Portable Pixmap (PPM), Adobe Photoshop (PSD), Sun Rasterfile (RAS), SGI, X BitMap (XBM), X PixMap (XPM), X Window Dump (XWD), AFX, Imara, Exif, WordPerfect Graphics Metafile (WPG), Macintosh Picture (PICT), Encapsulated PostScript (EPS), or other common file format used for images and which may optionally be converted to another suitable format prior to processing. Digital images may be individual photographs or video images. In general, each input digital image includes image data for an array of pixels forming the image. The image data may include color values for each of a set of at least two or three color separations, such as RGB, or may be expressed in another color space in which different colors can be represented. In displaying an image, a reduced pixel resolution version ("thumbnail") of a stored digital image may be used, which is considered to be displaying the image.

The exemplary digital images are tagged with natural language tags, which generally refer to the semantic content of the respective image. By semantic content, it is meant the visually perceptible content of the image. The tags may have been manually assigned or may be automatically extracted, for example, using a classifier.

A "user" can be any person or persons having access to a database of digital images, such as a graphic designer who is searching for an appropriate photograph to complement the remainder of a digital document, or an inexperienced user who is looking for interesting images.

The term "ranking" is used herein to refer to any type of score or numerical ranking. The terms scores and rankings may be used interchangeably herein, although it is to be appreciated that in some cases, a score may first be computed, such as a value between 0 and 1, followed by a numerical ranking (1 being the highest), based on the scores for a set of images. For example, the ranking is achieved by ordering the combination scores of each of a set of retrieved images and numbering the images sequentially, from highest to lowest score.

The terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Figure 1:
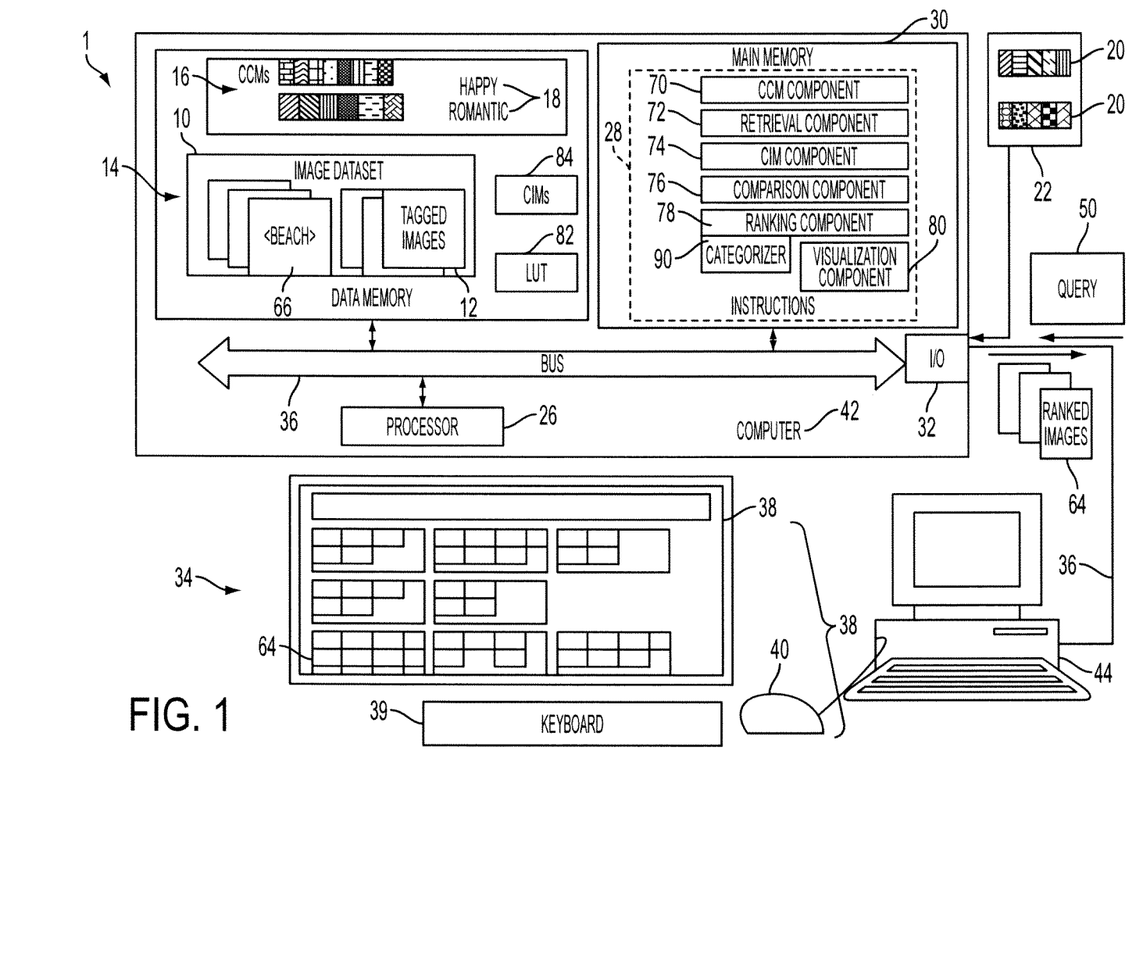
FIG. 1 is a functional block diagram illustrating a computer-implemented system for image ranking, in accordance with one aspect of the exemplary embodiment.

With reference to FIG. 1, an exemplary computer system 1 for retrieving and ranking images is shown. The system has access to a database 10 of chromatic objects, such as a large collection (e.g., hundreds, thousands, or millions) of images 12, such as photographic images and/or graphic images. The exemplary database 10 is stored in computer memory 14 of the system 1, although the database may alternatively comprise one or more databases, such as online or networked databases, which are stored in memory remote from the system 1. A set of CCMs 16 is stored in computer memory 14, one CCM for each of a set of predefined abstract concepts 18. The CCMs 16 are each derived from a respective set of color palettes 20 that are labeled with the respective abstract concept 18, or which are otherwise associatable therewith, which may have been retrieved from a remote database 22.

The computer system 1 includes a digital processor 26, such as the computer's CPU, and instructions 28, stored in associated main memory 30, for performing the exemplary method. These instructions 28 are executed by the processor 26. Main memory 30 may be integral with or separate from the data memory 12. An input/output device 32, such as a modem, allows the system 1 to communicate with a graphical user interface (GUI) 34 via a wired or wireless connection 36, such as a cable, local area network, or a wide area network, such as the Internet. The components 14, 26, 30, 32, 34 may communicate via a system bus 36.

The exemplary GUI 34 includes a display device 38 such as a color screen and one or more user input devices 39, 40, such as a keyboard, keypad, touch screen, voice input device, such as a microphone with associated speech to text converter, cursor control device, or combination thereof. The system 1 and GUI 34 may be hosted by separate but communicatively linked computing devices 42, 44, as shown. Alternatively, they may be hosted by the same computing device.

Figure 2:
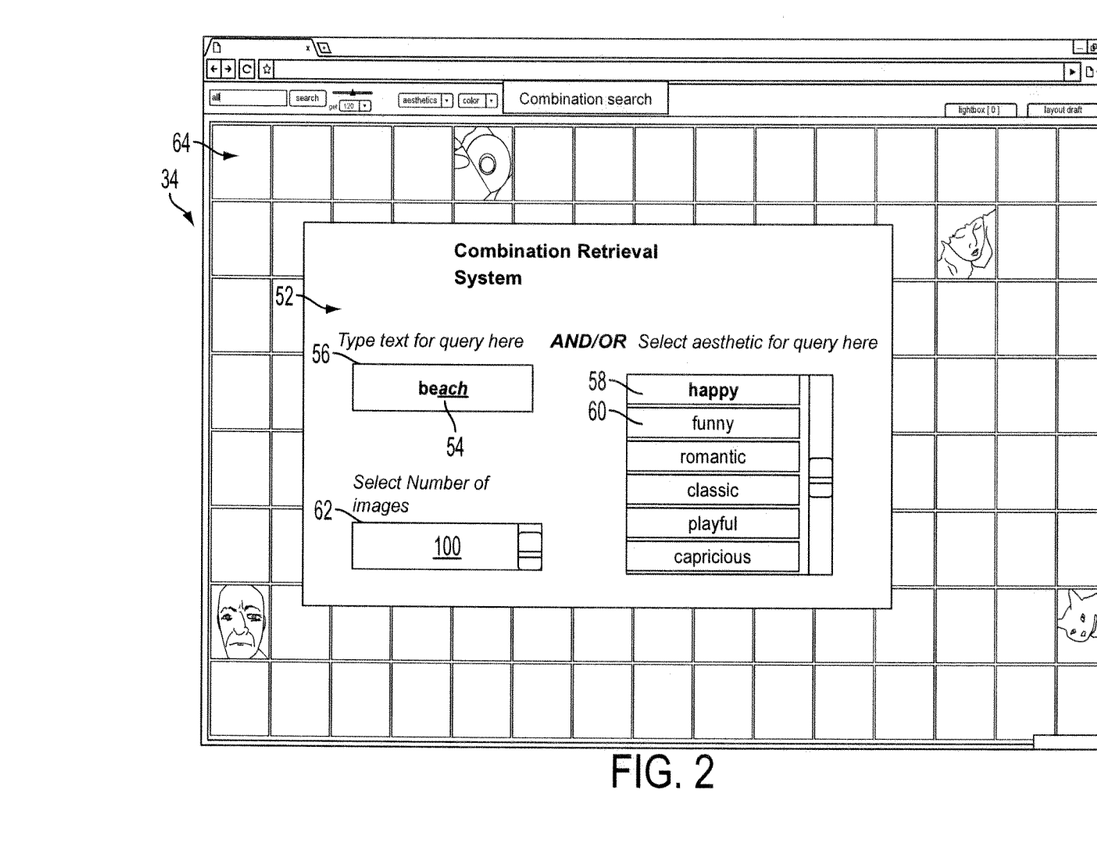
FIG. 2 illustrates a graphical user interface of the system of FIG. 1, in which search or image re-ranking can be based on abstract concepts such as "romantic" and "classic"

A user query 50 may be input to the system via the GUI 34 and I/O interface 32. For example, with reference also to FIG. 2, a user may be prompted via a window 52 to enter a two-part query. A first, textual part 54 of the query 50 is selected in a first area 56 of the window 52, for example, by typing one or more keywords 54 into the box 56. Here, the user has input the letters be and the system has proposed the word "beach" as the textual part of the query, using autocompletion techniques that may be based on information extracted from the database images, or otherwise. To select the second, abstract part 58 of the query 50, the user may be prompted to select from a predetermined set of abstract concepts e.g., to scroll down a list 60 of the predefined abstract concepts to select one of them. Here, the user has selected the abstract concept "happy," as the second part 58 of the query. The user may also be prompted to select a number 62 of images to be retrieved with the first part 54 of the query, e.g., from a drop down list. Here, the user has selected to retrieve 100 images based on the text query part "beach." Alternatively, the number 62 may be set by default or through operation of the search engine used. The interface 34 may display the retrieved images 64 as an array, for example, as disclosed in above-mentioned application Ser. No. 12/693,795. As will be appreciated, FIG. 2 illustrates just one example of a user interface 34, with other arrangements being contemplated.

In an exemplary embodiment, all or a portion of the images 12 in the dataset 10 are labeled with content tags 66 (FIG. 1), e.g., in the form of metadata associated with the image itself or in the form of a list which references the respective image by an identifier. The content tags 66 may each include a user's description of the respective image's content and/or some comments about the image. For example, an image 12 may be tagged with the two descriptions "beach" and "palm tree" and a comment such as "this looks romantic." In cases where the image 12 is surrounded by text, content tags can be derived from the surrounding text. Auto-tagging methods can be used to propagate tags to unlabeled images by computing a similarity between images in the dataset. These tags may be used in keyword searching using any suitable keyword-based search engine.

The computer 42, 44 is configured by suitable programming and/or hardwired firmware to embody the image retrieval and ranking system 1. The exemplary system 1 is in the form of software instructions 28 for performing the exemplary method which are stored in main memory 30 and executed by the processor 26. The illustrated instructions 28 include various software components including a CCM component 70, a retrieval component 72, a CIM component 74, a comparison component 76, a ranking component 78, and a visualization component 80. Briefly, the CCM component 70 computes a CCM 16 for each of a predefined set of abstract concepts 18, based on the tagged color palettes 20 which have been associated to that abstract concept, in a perceptually uniform color space, such as a Lab color space. The CCM component 70 may utilize a look up table (LUT) 82, or other data structure, which converts the colors of the palettes 20 from an original color space, such as RGB, to the perceptually uniform color space, prior to (or after) computing the CCM 16. The retrieval component 72 receives a two-part query 50, extracts the selected textual query part 54, and conducts a search of the textual part of the database 10 using a search engine, based on the textual query part 54 (and/or abstract query part 58 used as a semantic query). The CIM component 74 computes a respective CIM 84 for each of the images 64 retrieved by the retrieval component 72 from dataset 10 (or for all images 12 in the dataset). The comparison component 76 computes a comparison measure between the CIMs 84 of the retrieved images and the CCM 16 corresponding to the abstract concept 18 selected as the second query part 58. The ranking component 78 computes a first ranking for the retrieved images 12, based on responsiveness to the first query part, computes a second ranking for the retrieved images based on the comparison between the CIMs 84 and CCM 16 corresponding to the selected second query part, and computes a combined ranking, based on the first and second rankings. The visualization component 80 visualizes the retrieved and ranked images 64 for display on the GUI 34. As will be appreciated, the software components 70, 72, 74, 76, 78, 80 forming instructions 28 are shown as blocks largely for convenience of description, and may be combined or separated.

The digital processor 26 can be variously embodied, such as by a single-core processor, a dual-core processor (or more generally by a multiple-core processor), a digital processor and cooperating math coprocessor, a digital controller, or the like. The computer(s) 42, 44 may each include one or more dedicated or general purpose computing devices, such as a server computer, a desktop or laptop computer, palmtop computer, portable digital assistant (PDA), camera, or other computing device(s) capable of executing instructions for performing the exemplary method. The memories 14, 30 may be separate or combined and may represent any type of non-transitory computer readable medium such as random access memory (RAM), read only memory (ROM), magnetic disk or tape, optical disk, flash memory, or holographic memory. In one embodiment, the memory 14, 30 comprises a combination of random access memory and read only memory. Computer 44 may be configured with a processor and memory, as for computer 42.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
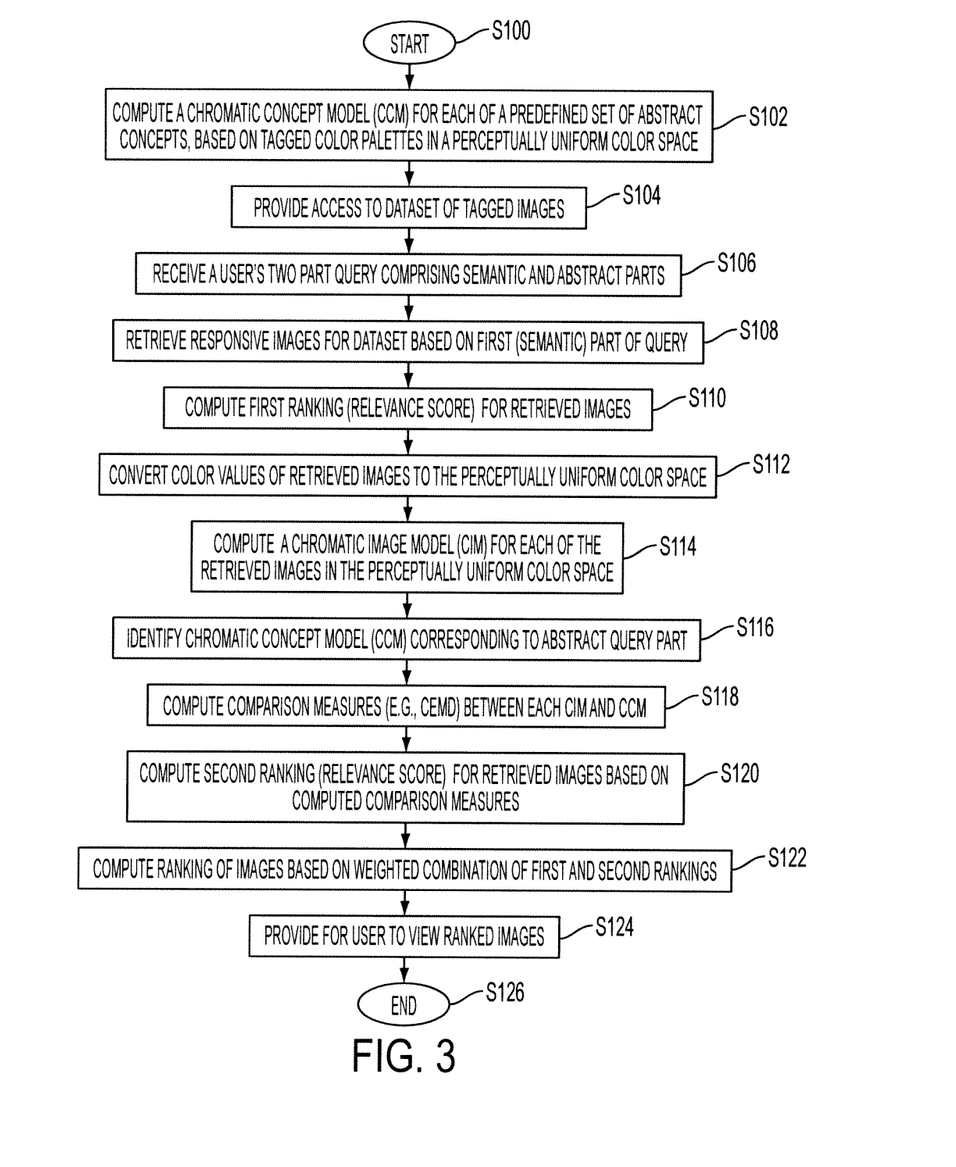
FIG. 3 illustrates a method for ranking images based on textual queries and abstract concepts, in accordance with another aspect of the exemplary embodiment.

With reference to FIG. 3, a computer-implemented method which may be performed with the apparatus of FIG. 2 is shown. The method, details of which are described in greater detail below, begins at S100.

At S102, abstract concepts 18 are represented by color palettes, which can be learned offline. In particular, a chromatic concept model (CCM) 16 is learned for each of a set of predefined abstract concepts 18, based on a respective set of colors 20 which have been associated with that abstract concept. Each CCM 16 is associated, in computer memory 14, with a textual description of the abstract concept. The textual description may include one or more words, such as "happy," "romantic," or the like. In the exemplary embodiment, each textual description includes no more than one word.

At S104, provision is made for access to a dataset 10 of images 12, each of which may be associated with textual information, such as metadata e.g., one or more textual tags. This textual information may be extracted and stored.

At S106, an interface 52 is provided for a user to input a query 50, including a first part (textual, i.e., semantic) 56 and a second part 58 (abstract), which is selected from the set of predefined abstract concepts 18. For example, the user inputs a textual query including one or more terms (e.g., keywords) for the first part 54 and selects a concept 58 for the second part. The user's text query is received, via the GUI 34.

At S108, a subset of images 64 from dataset 10 responsive to the semantic part (e.g., first part) of the query is retrieved. For example, at least a set of those images that are tagged with a "content" label corresponding to a query term or terms 54 are retrieved, together which a measure of how relevant they are to a search query based on the semantic part.

At S110, the subset 64 of images corresponding to the semantic part 56 of the query is ranked based on the relevance output at S108 and may be displayed on the GUI 34 in order of relevance. The images 12 are ranked by a relevance score, which may be content-based as given by a categorization algorithm, or content and concept-based, as given by a tag-based system.

At S112, pixels of the retrieved images 64 are converted to a perceptually uniform color space. This may be performed by using look up table 82 or other data structure. While all the pixels of the image may be used for generating the CIM 84, in one embodiment, a representative set of pixels is randomly selected from the image 64 and converted to the perceptually uniform color space.

At S114, a CIM 84 is computed for each retrieved image 64, in the perceptually uniform color space, using the converted pixel values output at S112.

At S116, which may be performed at an earlier stage, a chromatic concept model (CCM) 16 corresponding to the abstract part 58 of the query 50 is identified.

At S118, for each retrieved image 64, a comparison measure, e.g., a distance measure, is computed between the CIM 84 of the retrieved image 64 output at S114 and the CCM 16 corresponding to the abstract part 58 identified at S116. The exemplary comparison measure is the Color-based Earth Mover's Distance (CEMD), as described in further detail below.

At S120, for the set of retrieved images 64, an abstract concept score (e.g., ranking) is computed for each image, based on the distance measures between the CIMs of the images and the CCM 16 computed at S116.

At S122, the retrieved images 64 are scored (e.g., ranked) based on the first (semantic-based) ranking computed at S110 and second (abstract concept-based) ranking computed at S120. This step may be referred to herein as re-ranking.

At S124, the re-ranked images 64 (or at least a set of the more highly ranked ones) are visualized and displayed on GUI 34 to a user. Representations of the CIM 84 corresponding to each displayed image (e.g., as color palettes) and/or CCM 16 for the selected abstract concept (e.g., as a color palette) may be also shown on the display. The displayed images 64 may be processed and grouped using a set of software tools, such as K-means, and the like, to create a visually coherent search space. Grouping of the images can be performed using K-means clustering or partitioning of the space according to features selected by the user, as described in copending U.S. application Ser. No. 12/693,795.

At the user's selection, the method may return to S106, where the user may select a new query 50, or part of a query. Or, the user may select one of the images 64 and/or its respective CIM 84 as a color palette for incorporation into a document, tag one or more of the images/CIM's for later retrieval, extract information from the image/CIM (such as a portion of the image, its meta data, or the like), print the image/CIM, move it to another memory storage device, use the image/CIM for a further search to retrieve responsive images/CIM's or perform any other computer-implemented processing step based on the retrieved image(s)/CIM(s), for which instructions may be stored in memory of the system or elsewhere. The method ends at S126.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for image retrieval and ranking.

The method illustrated in FIG. 3 may be implemented in a non-transitory computer program product or products that may be executed on a computer. The computer program product may include a non-transitory computer-readable recording medium on which a control program is recorded, such as a disk, hard drive, or the like configured for performing the method. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. The computer program product may be integral with the computer 42,44 (for example, an internal hard drive or RAM), or may be separate (for example, an external hard drive operatively connected with the computer 42,44), or may be separate and accessed via a digital data network such as a local area network (LAN) or the Internet (for example, as a redundant array of inexpensive or independent disks (RAID) or other network server storage that is indirectly accessed by the computer 42,44 via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

Various aspects of the method and apparatus will now be described in greater detail.

A. Query Formulation (S106)

In one embodiment, the user may be presented with two sets of vocabulary: one composed of keywords 54 indicative of semantic image content, and a second set composed of keywords 58 indicative of abstract image concepts. The user formulates his query using one or more words from one or both vocabulary sets, as illustrated, for example, in FIG. 2. If a user selects only a keyword from the second (abstract) vocabulary, the first part of the query may use the selected keyword/abstract concept as the semantic part of the query also.

The first vocabulary may be extracted from the textual information associated with images 12 in the database 10. This is useful when the contents of the database are known, for example, stored locally. When the database is accessed online and its textual contents are not readily processed beforehand, the user may have a free choice in selection of keywords for the first part of the query, i.e., is not limited to a specific vocabulary.

B. Image Retrieval (S108)

Images 64 from among images 12 are retrieved using the user's input query 50. The images may be retrieved based on the first part 56 of the query, on the second part 58 (used as the semantic part also) or on both parts 56, 58 considered as the semantic part. Retrieval can also be based on other parameters, which may be unspecified by the user, particularly if an Internet-based commercial search engine is used for retrieval of images 64. The order of the images output by many tag-based image retrieval systems is often based on hidden parameters, such as tag relevance, price, uploading date or other. One way of defining a score $P_c(i)$ for each image is:

$$P_c(i)=1-i/N \qquad (1)$$

where i=1 ... N, and N is the number of retrieved images 64. This strategy ensures that the first (most relevant) image has the highest score, the second image has the second highest score, and so on. Any other technique which ensures a relevance-based ranking can be alternatively used.

In one embodiment, a categorizer 90 is previously trained on a set of training images (taken from database 10 or elsewhere) and manually assigned category tags is available to the system 1 (e.g., as software stored in memory 30, which is implemented by processor 26). The trained categorizer assigns a probability to an image of being in a given category 56 based on low level features extracted from the image. Such a system is a Generic Visual Categorization (GVC) system, which is described, for example in above-mentioned U.S. Pub. Nos. 20070005356, 20070258648, and 20080069456. Such a categorizer 90 may provide a score based on how relevant an image is to the semantic concept 54 (such as "beach"), based on features extracted from the image. The probability of the image belonging to a semantic concept 54 is obtained and then the probabilities of the top-ranked images are normalized to obtain a score in the 0-1 range. $P_c(i)$ is then a visual-based score.

As will be appreciated, the first ranking could be based on a combination of the visual-based and tag-based scores.

The number of images retrieved in this step can be selected by a user as noted above, by a default selection (e.g., the top twenty, one hundred, or one thousand images are retrieved). Alternatively or additionally, retrieval may be based on a relevance threshold—for example, in one embodiment, only images exceeding a threshold relevance may be retrieved, e.g., the top one hundred images are retrieved, provided that they exceed the threshold.

C. Generating CCMs for Abstract Concepts (S102) and CIM's for Images (S114)

1. CCMs

Any number of abstract concepts 18 may be selected, such as at least two or at least five or at least eight abstract concepts, and in one embodiment, there may be up to a hundred abstract concepts, or more. Exemplary abstract concepts include emotions, moods and other aesthetic concepts, such as capricious, classic, delicate, earthy, elegant, romantic, luscious, playful, robust, sensual, serene, spicy, spiritual, and warm (see, for example, the list of concepts in Eiseman, L., "Pantone Guide to Communicating with Color," Graffix Press, Ltd., 2000) (Hereinafter, "Eiseman").

Given such a predefined set of abstract concepts, a CCM 16 is built for each concept 18. This can be performed by estimating a probabilistic representation of the abstract concept, such as a Gaussian Mixture Model (GMM), or other generative model, for the set of colors representing that concept. A GMM is essentially a weighted set of Gaussian functions (Gaussians). The CCM 16 can thus be constituted by the means of the Gaussians in the GMM (which correspond to color values in the perceptually uniform color space) and their associated weights. The models 16 can thus each be considered as a weighted color palette.

The colors representing the abstract concept 18 that are used for generating the concept's GMM, serve as observations which are input to an algorithm, such as an Expectation-Maximization algorithm, which generates the GMM. These colors can be extracted from color palettes 20 annotated with labels corresponding to that abstract concept 18 or from representative images which are manually or otherwise associated with the abstract concept. In particular, the colors of the labeled color palettes 20 obtained from Eiseman designed by professional graphic designers may be used as the observations. For example, all the colors of the color palettes 20 associated with the abstract concept "classic" are used to generate a GMM for the "classic" abstract concept 18. These colors are considered as an unordered set, i.e., without reference to which color palette 20 they came from. In another embodiment, a GMM for the concept may be estimated using color palettes as observations, rather than on the individual colors.

The observation data for the GMM of an abstract concept are thus color values expressed in a perceptually uniform color space, such as CIE Lab or CIE Luv. In the exemplary embodiment, the color values are the ab representations in the Lab color space of the swatches of all the palettes 20 that are associated with that concept 18 in the database 22 of palettes. The exemplary concept palettes 16 are thus statistically representative of colors of the respective predefined color palettes. The component 70 does not consider which predefined palette 20 the colors originated from, but simply takes as training data, color values of all the swatches of the respective set of color palettes 20. In the exemplary embodiment, the lightness value L of each color is not considered. This step can be performed offline, i.e., before an image is selected.

The GMMs may be computed by the method described in above-mentioned U.S. Ser. No. 12/890,049. Briefly, this includes determining a suitable number of Gaussian functions to form the GMM, e.g., through agglomerative clustering or other type of clustering. Initially, the weights in the GMM may all be set to the same value.

Let the parameters of the GMM for the CCM 16 be denoted by $\lambda^c = \{w_i^c, \mu_i^c, \Sigma_i^c, i=1 \ldots N\}$ where $w_i^c, \mu_i^c,$ and $\Sigma_i^c$ are respectively the weight, mean vector and covariance matrix of Gaussian i, and N denotes the number of Gaussian components. It is assumed in the illustrative embodiments herein that the covariance matrices $\Sigma_i^c$ are diagonal. x denotes an observation (here the vector including the two chromaticity coordinates a,b of one color of a palette in the input set of palettes 20) and q denotes which Gaussian emitted x. The likelihood that x was generated by the GMM is:

$$p(x|\lambda^c) = \sum_{i=1}^{N} w_i^c p_i(x|\lambda^c),$$

where $p_i(x|\lambda^c) = p(x|q=i, \lambda^c)$.

The weights are subject to the constraint:

$$\sum_{i=1}^{N} w_i^c = 1.$$

The components $p_i$ are given by:

$$p_i(x_t|\lambda^c) = \frac{\exp\left\{-\frac{1}{2}(x_t - \mu_i^c)'|\Sigma_i^c|^{-1}(x_t - \mu_i^c)\right\}}{(2\pi)^{D/2}|\Sigma_i^c|^{1/2}},$$

where |.| denotes the determinant operator and D denotes the dimensionality of the feature space (here 2, since only a and b values are used).

Let $X = \{x_t, t=1 \ldots T\}$ denote the set of colors, which is the (a,b) values all the colors of the predefined palettes 20 that are associated with the given concept in the palette database 22. The parameters of the GMM can be obtained by maximizing the log-likelihood function log $p(X|\lambda^c)$, which is generally referred to as Maximum Likelihood Estimation (MLE). A known procedure for MLE is the Expectation Maximization (EM) algorithm (See, for example, Dempster, A.; Laird, N. & Ruin, D., "Maximum likelihood from incomplete data via the EM algorithm," *Journal of the Royal Statistical Society*, 39, 1-38, 1977). EM alternates two steps:

i. An expectation (E) step where the posterior occupancy probabilities are computed based on the current estimates of the parameters. The occupancy probability, which is the probability that observation $x_t$ has been generated by Gaussian i, is $\gamma_i(x_t) = p(q_t = i | x_t, \lambda^c)$. This probability is suitably computed using Bayes formula as:

$$\gamma_i(x_t) = \frac{w_i^c p_i(x_t|\lambda^c)}{\sum_{j=1}^{N} w_j^c p_j(x_t|\lambda^c)}.$$

ii. A maximization (M) step where the parameters are updated based on the expected complete-data log-likelihood given the occupancy probabilities computed in the E-step:

$$\hat{w}_i^c = \frac{1}{T}\sum_{t=1}^{T}\gamma_i(x_t),$$

$$\hat{\mu}_i^c = \frac{\sum_{t=1}^{T}\gamma_i(x_t)x_t}{\sum_{t=1}^{T}\gamma_i(x_t)},$$

$$\hat{\Sigma}_i^c = \frac{\sum_{t=1}^{T}\gamma_i(x_t)x_t x_t'}{\sum_{t=1}^{T}\gamma_i(x_t)} - \hat{\mu}_i^c \hat{\mu}_i^{c'}.$$

In this embodiment, the EM algorithm is only guaranteed to converge to a local optimum, not to a global one. The location of convergence is dependent on the initialization parameters. In other words, different initialization conditions will, in general, lead to different concept palettes. By using the clustering method for initialization, convergence is more likely to achieve a global optimum. The EM algorithm can be iterated a fixed number of times or until the results approach convergence.

The resulting GMM includes a limited set of Gaussian functions, generally fewer in number than the number of the colors used as observations, such as, for example, from about 3 to about 50 weighted Gaussian functions. The means (a,b values) of the Gaussian functions in the GMM can be taken as the representative colors of the CCM 16 and the corresponding mixture weights of the Gaussian functions as the corresponding weights of the colors.

2. CIMs

Similar to the method described for the CCMs, a CIM 84 can be extracted from each image 12 using a Gaussian Mixture Model representation, the parameters of which are learned using the input image pixels as observations. The CIMs 84 of the retrieved images can each have the same number of Gaussian functions or may have different numbers.

The CIM's 84 can be generated offline for all images 12 in the dataset 10 or can be generated online at S114 for just the images 64 that were retrieved at S108.

CIMs 84 can be generated in the same way as for the CCM's 16, but in this case, the observations for generating the respective GMM are colors extracted from the image 12, such as a set of representative pixel colors, which are converted to the same perceptually uniform color space (e.g., Lab or just the a,b component) as for the color palettes 20. These colors are considered as an unordered set ("a bag of pixels") i.e., without reference to the locations of these pixels in the image.

For example, a GMM composed by a number n of m-dimensional Gaussians (Gaussian functions) is fitted to the image in a suitable, perceptually uniform color space, such the L*a*b color space (e.g., n≧3, such as 5 and m=2, in the case of a,b or 3 in the case of L, a, and b). The means of the e.g., five Gaussians are then taken as the representative colors of the image 64. In this method, the a,b values, for example, of each pixel in the image (or a representative set of pixels) are first identified. A generative model is then trained to estimate the parameters of, for example, five Gaussians (Gaussian functions) which, in a weighted combination, best fit the data. The parameters of the Gaussians to be estimated are the respective mean (R,G,B color), the covariance, and a mixture weight. To identify the Gaussians' parameters, an Expectation Maximization (EM) algorithm may be used which alternates between performing an expectation (E) step and a maximization (M) step.

The computation of the GMM may be a follows: parameters of the GMM are denoted by $\lambda = \{w_i, \mu_i, \Sigma_i, i=1 \ldots n\}$ where $w_i$, $\mu_i$, and $\Sigma_i$ are respectively the weight, mean vector and covariance matrix of Gaussian i, and n denotes the number of Gaussian components (here n=5). If x denotes an observation (here, a vector with three values representing the color of a pixel in the image) and q denotes which Gaussian emitted x, then the likelihood that x was generated by the GMM is:

$$p(x|\lambda) = \sum_{i=1}^{n} w_i p_i(x|\lambda),$$

where $p_i(x|\lambda) = p(x|q=i, \lambda)$.

The weights are subject to the constraint: $\Sigma_{i=1}^{n} w_i = 1$. The components $p_i$ are given by:

$$p_i(x_t|\lambda) = \frac{\exp\left\{-\frac{1}{2}(x_t - \mu_i)'\Sigma_i^{-1}(x_t - \mu_i)\right\}}{(2\pi)^{D/2}|\Sigma_i|^{1/2}}, \quad (2)$$

where |.| denotes the determinant operator and D denotes the dimensionality of the feature space (here D=2, if the observations have 2 dimensions, such as a,b color values).

Let $X = \{x_t, t=1 \ldots T\}$ denote the set of input image pixels. The parameters of the GMM can be obtained by maximizing the log-likelihood function log $p(X|\lambda)$, through Maximum Likelihood Estimation (MLE), which involves one or more iterations of an expectation (E) step and a maximization (M) step, e.g., until the results approach convergence or for a predetermined number of iterations. In the expectation (E) step, the posterior occupancy probabilities are computed based on the current estimates of the parameters. The occupancy probability, which is the probability that observation $x_t$ has been generated by Gaussian i, is $\gamma_i(x_t) = p(q_t = i|x_t, \lambda)$. This probability is computed as:

$$\gamma_i(x_t) = \frac{w_i p_i(x_t|\lambda)}{\sum_{j=1}^{n} w_j p_j(x_t|\lambda)}.$$

In the maximization (M) step, where the parameters are updated based on the expected complete-data log-likelihood given the occupancy probabilities computed in the E-step:

$$\hat{w}_i = \frac{1}{T}\sum_{t=1}^{T} \gamma_i(x_t),$$

$$\hat{\mu}_i = \frac{\sum_{t=1}^{T} \gamma_i(x_t) x_t}{\sum_{t=1}^{T} \gamma_i(x_t)},$$

$$\hat{\Sigma}_i = \frac{\sum_{t=1}^{T} \gamma_i(x_t) x_t x_t'}{\sum_{t=1}^{T} \gamma_i(x_t)} - \hat{\mu}_i \hat{\mu}_i'.$$

The resulting GMM includes a limited set of Gaussian functions, generally fewer in number than the number of the colors from the image that are used as observations, such as, for example, from about 3 to about 50 weighted Gaussian functions. However, it is contemplated that for some images which are more monochromatic, fewer Gaussian functions may be needed to represent the respective image.

The output of S114 is the mean (a, b color values) of each of the Gaussians and a corresponding mixture weight. The means are stored as the colors of the CIM 84. The mixture weights, which sum to 1, can be used to give a relative importance to the respective colors in computing distances.

As will be appreciated, a GMM is one option for generating a chromatic representation of an image or abstract concept. Alternatively, other clustering methods can be used to extract such representations directly from images (e.g., K-means in a perceptually uniform color space, binary trees, or the like). Such methods, which have been used previously for image quantization, can alternatively be employed to extract the dominant colors of an image. This is especially if only the representative colors are used, and not a distribution over them. See, also Solli, M. & Lenz, R. Color Harmony for Image Indexing, *IEEE Int'l Conf. on Computer Vision Workshop*, 2009, 1885-1892, M. T. Orchard and C. A. Bouman, "Color quantization of images," IEEE Transactions on Signal Processing 39, pp. 2677-2690 (1991). In practice, however, the exemplary GMM approach provides a good representation of the perceived dominant colors.

D. Abstract Concept Score Computation

Given an abstract concept 18 selected in S106, at S118 a score is calculated for each of a set of retrieved images 64 using the CCM (color palette) 16 representing the abstract concept as a reference and the CIM 84 representing the respective image.

To compute a comparison measure, in the exemplary embodiment, an adapted version of the EMD is used where the Euclidean metric is replaced with a CIE DeltaE2000 metric (See, Gaurav Sharma, Wencheng Wu, Edul N. Dalal, "The CIEDE2000 color-difference formula: Implementation notes, supplementary test data, and mathematical observations," Color Research & Application, Volume 30, Issue 1, pp. 21-30 (February 2005), available at www.ece.rochester.edu/~gsharma/ciede2000/, hereinafter, "Sharma 2005.") On color palettes, such as the exemplary weighted set of Gaussian means corresponding to a CCM or CIM, this measure has been found to provide good performance results in a retrieval task, when compared with existing methods for distance-based comparison. The top CIMs retrieved based on the CEMD measure also tend to be more visually coherent as compared with the top CIM's retrieved based on the EMD measure.

It is to be appreciated that other comparison measures may alternatively be used in place of the CEMD. For example, the probability product kernel, the chi² distance, the Kullback-Leibler (KL) divergence, the Jensen-Shannon divergence, the Euclidian distance, the Manhattan distance, or the cosine similarity may be used in computing similarity between each CIM and a CCM. Other measures can be also contemplated, in particular, those which take into account the parameters of the Gaussians in GMM representations.

1. The Color-Based Earth-Mover's Distance (CEMD)

The comparison measure can be computed at S118, as follows.

Let c represent an abstract concept 18, and let its model (CCM) 16 be denoted by $M^c$. Given an image i, its CIM 84 is denoted by $M^i$.

The CEMD is then computed as follows:

$$CEMD(S_1, S_2) = \frac{\sum_{i=1}^{m}\sum_{j=1}^{n} f_{ij} d_{ij}}{\sum_{i=1}^{m}\sum_{j=1}^{n} f_{ij}} \quad (2)$$

where $S_1$ and $S_2$ are two optionally-weighted color palettes (i.e., one is $M^c$, the other is $M^i$);

m represents the number of colors in $S_1$ and n represents the number of colors in $S_2$;

$d_{ij}$ is the distance between colors $S_{1i}$ and $S_{2j}$;

$S_{1i}$ and $S_{2j}$ are the $i^{th}$ and $j^{th}$ swatches or colors (e.g., color values corresponding to respective ones of the GMM means), of the color palettes $S_1$ and $S_2$; and $f_{ij}$ is the flow between $S_{1i}$ and $S_{2j}$.

The flow $F=[f_{ij}]$ is computed such that it minimizes a cost, such as the following cost:

$$C = \sum_{i=1}^{m}\sum_{j=1}^{n} f_{ij} d_{ij} \quad (3)$$

subject to one or more (e.g., all) of the following constraints:

$$f_{ij} \geq 0 \quad 1 \leq i \leq m, 1 \leq j \leq n \quad (3A)$$

$$\sum_{j=1}^{n} f_{ij} \leq w_{S1i} \quad 1 \leq i \leq m \quad (3B)$$

$$\sum_{i=1}^{m} f_{ij} \leq w_{S2j} \quad 1 \leq j \leq n \quad (3C)$$

$$\sum_{i=1}^{m}\sum_{j=1}^{n} f_{ij} = \min\left(\sum_{i=1}^{m} w_{S1i}, \sum_{j=1}^{n} w_{S2j}\right) \quad (3D)$$

where w represents a weight associated to a given color of a color palette, thus, $w_{S1i}$ is the weight assigned to swatch i of color $S_{1i}$ of color palette $S_1$, and $w_{S2j}$ is the weight assigned to swatch j of color $S_{2j}$ of color palette $S_2$.

In the exemplary embodiment, $S_1$ corresponds to $M^i$ and $S_2$ corresponds to $M^c$. As noted above, the colors of these two weighted color palettes 84, 18 are represented in a perceptually uniform color space, such as the Lab space, which captures perceptual differences better than other spaces such as RGB. In addition the Lab space provides a split between the lightness and chromaticity components of the color. One advantage of the CEMD (and similarly for the conventional EMD) is that it is easy to compute the distance between two color palettes of different lengths (number of colors). The weights allow different relative importance to be given to each of the colors in the respective color palettes. In one embodiment, equal weightings may be given to the colors of a color palette 16, 84. In other embodiments, the first swatches are considered more important and thus higher weights are assigned to them. In the case of a GMM representation of a color palette 16, 84, the weights of the Gaussians in the GMM can be used directly as the weights $w_{S1i}$ and $w_{S2j}$.

2. Scoring (S120)

Given a set of images 64, each with a respective model $M^i$ 84, and an abstract concept model $M^c$ 16, an abstract concept score is computed for each image. The score is calculated for each image using the CEMD($M^i$, $M^c$) computed as described above, or other distance-based measure. Let $d_{ci}$ denote this distance between the abstract concept model $M^c$ and image color palette $M^i$. One method for normalizing theses scores for image i, to generate an abstract concept score denoted by $P_a(i)$, is:

$$P_a(i) = \left(1 - \frac{d_{ci}}{\max(d_{c1}, d_{c2}, \ldots, d_{cN})}\right) \quad (4)$$

for i=1 . . . N, where N is the number of retrieved images 64 for which scores are computed. This formulation ensures that images with color palettes having a small distance to the concept color palette $M^c$ 16 have high scores. It also normalizes the score values to the 0-1 range, which makes it easy to combine with the semantic concept score $P_c(i)$.

E. Image Re-Ranking (S122)

Images 64 can be reordered using a re-ranking score which is computed with a ranking function that is based on a semantic concept score $P_c(i)$ computed at S110 and abstract concept score $P_a(i)$ computed at S120. The ranking function can be a weighted combination of these scores:

$$P_r(i)=(1-\alpha)P_c(i)+\alpha P_a(i), 0 \leq \alpha \leq 1 \quad (5)$$

where $P_r(i)$ is the total score and α represents a weighting parameter which is preselected, e.g., based on empirical observations or by a user.

Note that when α=0, the total score is the relevance score or content score, and when α=1, the total score is the abstract score. The α parameter may be tunable, which allows the user to add the effect of image content or relevance, which may be a combination of content and concept, in addition to the target abstract concept. In another embodiment, is a default parameter. In one exemplary embodiment, 0<α, e.g., 0<α<1, i.e., both scores impact the final ranking. However, since the retrieved images are already preselected, even if α=1, the textual (semantic) part of the query still contributes to the set of images 64 that are displayed.

As discussed above, $P_c(i)$ can be obtained using an algorithm which computes scores for images belonging to content classes such as the GVC algorithm. Alternatively, they can be obtained from any other visual-based algorithm which is used to classify images by content. In the examples below, the images are obtained from Google Images and are attributed to contents in a tag-based fashion.

F. Visualization

The user may be shown the ranked images 64 together with their corresponding color palettes (i.e., the colors of their CIMs 84, e.g., as a set of color swatches, which may be ordered according to their weight). The user can also be shown the concept color palette (e.g., as a set of color swatches, which may be ordered according to their weight), corresponding to the CCM 16 used as a reference in the ranking. In one embodiment the user may be provided with the option of altering the concept palette, for example, by changing the color values of the swatches, adding or removing color swatches, or changing the respective weights. The system then returns to S118 and recomputes the comparison measures and image rankings at S120, in a simple and straightforward manner.

The exemplary system and method are particularly suitable for unskilled users who have to design graphic-rich documents while adhering to a particular theme. A user may, for example, be seeking an image conveying a particular message irrespective of the image's semantic content. Indeed, artists often seek unexpected images. Such images may have an aesthetic theme which does not correlate well with the semantic content/tags of the image. For example, an image which is tagged as a "romantic landscape" may best be described with the abstract concept "traditional."

The exemplary method may find application in variable data applications, such as 1 to 1 personalization and direct mail marketing where images are selected to be incorporated into a template document. Variable document creation poses various challenges to the assurance of a proper aesthetic level due the portion of dynamic content they include. One of them is how to treat visual aspects dynamically within the variable data workflow, so that the enhancement or management operations are handled in a more context sensitive fashion. The exemplary method can be used to assist a user to find images based on an aesthetic concept. Retrieved images based on a specific content and/or concept are re-ranked and therefore the user can find the most relevant images for his or her purposes in an efficient manner. Alternatively, the top ranked image(s) may be incorporated directly into a document without user input. Other applications, such as image and document asset management or document image/photograph set visualization, etc., can also profit from it.

Without intending to limit the scope of the exemplary embodiment, the following example demonstrates the application of the method.

Example

In the following Example, only the chromaticity component or ab vector of the representation of a swatch (color) is used. As a metric, the deltaE distance (Sharma 2005) is used, instead of the Euclidean distance, to obtain a Color-based EMD (CEMD) between the concept CCM and each of the image CIMs. The color palettes from the Eiseman book were used to generate concept CCMs.

200 images were downloaded from GoogleImages for each of a set of queries. These queries were related to predefined abstract concepts. The query used in each case is the name of the abstract concept concatenated with "colors." In the case of "romantic," for example, the query is "romantic colors." This was simply to generate a set of images which covered a variety of concepts, and would not be needed in a normal search.

Given all the downloaded images, a score is computed for each text query (e.g., an image's relevance to "romantic colors") as described at S110, and an abstract concept score computed as described in S120. The images are then ranked by the score. The rankings are compared to those obtained from Google Images for the same query. The figures show that the images ranked using their abstract concept scores, which employ the CEMD, provide more visually coherent and plausible results than those obtained using GoogleImages.

For re-ranking images as described in step S122, images were re-ranked with different values of $\alpha$. In each case, 100 images were downloaded from GoogleImages with a given semantic query (such as "beach"). The images were then re-ranked by a concept, such as the "romantic" concept with different values of $\alpha$ (0, 0.5, and 1). The differences could be seen by looking at the top-most re-ranked images. While some of the images in the group of seven images with the highest rankings at S122 were often the same for different values of $\alpha$, the value of $\alpha$ selected does affect the order of images and/or the images present in this set.

In a comparison study between the exemplary CEMD and several existing methods for computing similarity, the CEMD was found to be the best distance metric overall.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for ranking images comprising:
receiving a query comprising a semantic part and an abstract part;
retrieving a set of images responsive to the semantic part of the query;
computing first scores for the retrieved images in the set of retrieved images, each first score being based on a relevance of a retrieved image to the semantic part of the query;
computing a chromatic concept model for each of a set of abstract concepts, the chromatic concept model comprising a Gaussian Mixture Model wherein observations for the Gaussian mixture model are colors of at least one color palette which is associated with the abstract concept expressed in a perceptually uniform color space;
identifying one of the set of chromatic concept models, based on the abstract part of the query;
for retrieved images in the set of retrieved images:
computing a chromatic image model based on colors of the image, the chromatic image model comprising a weighted set of colors expressed in the perceptually uniform color space, and
computing a comparison measure between the chromatic image model and the identified chromatic concept model;
computing second scores for the retrieved images that are based on the computed comparison measures; and
ranking the retrieved images based on a combined score for a respective retrieved image which is a function of the first and second scores.

2. The method of claim 1, wherein at least one of the computing of the first scores, computing of the second scores, and ranking of the retrieved images is performed with a computer processor.

3. The method of claim 1, further comprising, providing for a user to review at least some of the retrieved images.

4. The method of claim 3, wherein the method includes displaying at least some of the retrieved images in an arrangement which reflects the combined scores.

5. The method of claim 3, further comprising visualizing at least one of:
- the chromatic concept model; and
- at least one of the chromatic image models.

6. The method of claim 1, wherein the perceptually uniform color space is one which has a lightness component and two chromatic components.

7. A method for ranking images comprising:
- receiving a query comprising a semantic part and an abstract part;
- retrieving a set of images responsive to the semantic part of the query;
- computing first scores for the retrieved images in the set of retrieved images, each first score being based on a relevance of a retrieved image to the semantic part of the query;
- identifying one of a set of chromatic concept models, based on the abstract part of the query, the identified chromatic concept model comprising an optionally-weighted set of colors expressed in a perceptually uniform color space which has a lightness component and two chromatic components;
- for retrieved images in the set of retrieved images:
  - computing a chromatic image model based on colors of the image, the chromatic image model comprising a weighted set of colors expressed in the perceptually uniform color space, and wherein the colors of the chromatic image model are expressed only in the chromatic components of the perceptually uniform color space, and
  - computing a comparison measure between the chromatic image model and the identified chromatic concept model;
- computing second scores for the retrieved images that are based on the computed comparison measures; and
- ranking the retrieved images based on a combined score for a respective retrieved image which is a function of the first and second scores.

8. The method of claim 7, further comprising computing a chromatic concept model for each of a set of abstract concepts.

9. The method of claim 8, wherein the computing of the chromatic concept model for each of the set of abstract concepts comprises computing a Gaussian Mixture Model wherein observations for the Gaussian mixture model are colors of at least one color palette which is associated with the abstract concept.

10. The method of claim 1, wherein the computing of the chromatic image model comprises computing a Gaussian Mixture Model wherein observations for the Gaussian mixture model are colors of pixels of the image.

11. The method of claim 1, wherein the computing of the comparison measure between the chromatic image model and the chromatic concept model comprises computing a distance measure which is based on Euclidian distances in the perceptually uniform color space between the colors of the chromatic image model and colors of the chromatic concept model and the associated weights.

12. A method for ranking images comprising:
- receiving a query comprising a semantic part and an abstract part;
- retrieving a set of images responsive to the semantic part of the query;
- computing first scores for the retrieved images in the set of retrieved images, each first score being based on a relevance of a retrieved image to the semantic part of the query;
- identifying one of a set of chromatic concept models, based on the abstract part of the query, the identified chromatic concept model comprising an optionally-weighted set of colors expressed in a perceptually uniform color space;
- for retrieved images in the set of retrieved images:
  - computing a chromatic image model based on colors of the image, the chromatic image model comprising a weighted set of colors expressed in the perceptually uniform color space, and
  - computing a comparison measure between the chromatic image model and the identified chromatic concept model, wherein the computing of the comparison measure between the chromatic image model and the chromatic concept model comprises computing a Color-based Earth Mover's Distance (CEMD) according to the expression:

$$CEMD(S_1, S_2) = \frac{\sum_{i=1}^{m}\sum_{j=1}^{n} f_{ij}d_{ij}}{\sum_{i=1}^{m}\sum_{j=1}^{n} f_{ij}} \quad (2)$$

where $S_1$ and $S_2$ represent the chromatic concept model and chromatic image model, respectively;
m represents the number of colors in $S_1$ and n represents the number of colors in $S_2$,
$d_{ij}$ is the distance between colors $S_{1i}$ and $S_{2j}$;
$S_{1i}$ and $S_{2j}$ represent the $i^{th}$ and $j^{th}$ colors of $S_1$ and $S_2$, respectively; and
$f_{ij}$ is the flow between $S_{1i}$ and $S_{2j}$;
computing second scores for the retrieved images that are based on the computed comparison measures; and
ranking the retrieved images based on a combined score for a respective retrieved image which is a function of the first and second scores.

13. The method of claim 12, wherein the computing of the comparison measure comprises minimizing:

$$C = \sum_{i=1}^{m}\sum_{j=1}^{n} f_{ij}d_{ij} \quad (3)$$

subject to at least one of:

$$f_{ij} \geq 0 \quad 1 \leq i \leq m, 1 \leq j \leq n \quad (3A)$$

$$\sum_{j=1}^{n} f_{ij} \leq w_{S1i} \quad 1 \leq i \leq m \quad (3B)$$

$$\sum_{i=1}^{m} f_{ij} \leq w_{S2j} \quad 1 \leq j \leq n \quad (3C)$$

$$\sum_{i=1}^{m}\sum_{j=1}^{n} f_{ij} = \min\left(\sum_{i=1}^{m} w_{S1i}, \sum_{j=1}^{n} w_{S2j}\right) \quad (3D)$$

where $w_{S1i}$ is the weight assigned to color $S_{1i}$ and $w_{S2j}$ is the weight assigned to color $s_{2j}$ of $S_2$.

14. The method of claim 1, wherein the computing a combined score for retrieved images in the set as a function of the first and second scores comprises computing a weighed combination of the first and second scores.

15. The method of claim 1, further comprising displaying the images in a first arrangement based on the first scores and displaying the images in a second arrangement based on the combined scores.

16. The method of claim 1, wherein the method further comprises converting colors of at least one of the retrieved images from an original color space to the perceptually uniform color space prior to computing the image's chromatic image model.

17. A computer program product comprising a non-transitory recording medium encoding instructions which, when executed by a computer, perform the method of claim 1.

18. A system for performing the method of claim 1, comprising memory which stores instructions for performing the method and a processor in communication with the memory for executing the instructions.

* * * * *